United States Patent
Tsai

Patent Number: 5,150,261
Date of Patent: Sep. 22, 1992

[54] COMBINED SCREWDRIVER AND MAGNIFYING GLASS

[76] Inventor: Allan Tsai, 2F, No. 1, Lane 222, Tun-Hua N. Rd., Taipei City, Taiwan

[21] Appl. No.: 735,087

[22] Filed: Jul. 24, 1991

[51] Int. Cl.$^5$ ............................ G02B 7/02; B25F 1/00
[52] U.S. Cl. ........................................ 359/810; 81/3.5; 81/184; 81/490; 7/165; D8/87
[58] Field of Search ................. 7/165, 170; D8/87; 81/3.5, 184, 180.1, 490; 359/809, 810, 827

[56] References Cited

U.S. PATENT DOCUMENTS

| | | | |
|---|---|---|---|
| 858,131 | 6/1907 | Aichele | 81/490 |
| 2,455,972 | 12/1948 | Bowditch | 350/244 |
| 2,732,761 | 1/1956 | Bender et al. | 350/244 |
| 3,011,258 | 12/1961 | Kotchan | 350/244 |
| 4,253,357 | 3/1981 | Lane | 81/184 |

*Primary Examiner*—Roscoe V. Parker

[57] ABSTRACT

A combined screwdriver and magnifying glass includes a screwdriver having a handle and a shank connected to the handle; a block member made of elastic material detachably and frictionally sleeved around the shank; and a magnifying glass having a central hole, the block member being frictionally fitted in the central hole of the magnifying glass.

1 Claim, 4 Drawing Sheets

COMBINED SCREWDRIVER AND MAGNIFYING GLASS

BACKGROUND OF THE INVENTION

1. FIELD OF THE INVENTION

This invention relates to a screwdriver, more particularly to a combined screwdriver and magnifying glass.

2. DESCRIPTION OF THE RELATED ART

Magnifying glasses are used when workmen deal with mini-screws contained in eyeglasses, clocks, and watches etc. Usually, a workman holds a magnifying glass with one of his hands and operates a screwdriver with the other hand when tightening and loosening the mini-screws of eyeglasses. It is inconvenient and takes much time for the workman to complete the work. On the other hand, a workman might wear a monocle to screw a clock or a watch. This results in the workman's eyes becoming easily tired or sore.

SUMMARY OF THE INVENTION

Therefore, the objective of this invention is to provide a combined screwdriver and magnifying glass which is convenient for use.

Accordingly, a combined screwdriver and magnifying glass of this invention includes a screwdriver having a handle and a shank connected to the handle; a block member made of elastic material detachably and frictionally sleeved around the shank; and a magnifying glass having a central hole, the block member being frictionally fitted in the central hole of the magnifying glass.

BRIEF DESCRIPTION OF THE DRAWINGS

Other features and advantages of the present invention will become apparent in the following detailed description of the preferred embodiment with reference to the accompanying, of which.

DETAILED DESCRIPTION OF THE PREFERRED EMBODIMENTS

Figure 1:
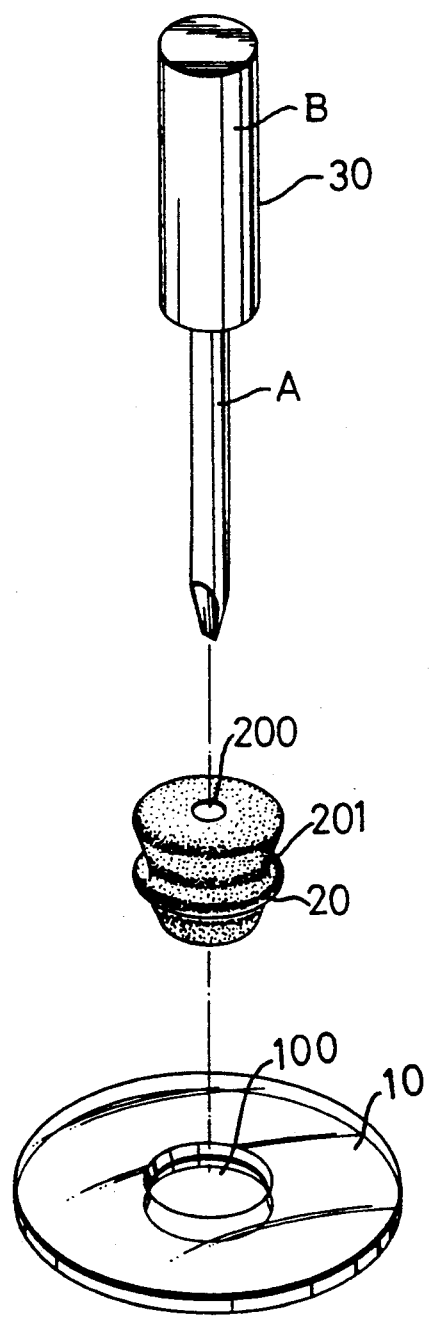
FIG. 1 is a perspective exploded view of a first preferred embodiment of the combined screwdriver and magnifying glass of this invention.

Referring to FIG. 1, a combined screwdriver and magnifying glass of this invention includes a screwdriver 30 having a handle (B) and a shank (A), a block member 20 made of elastic material having a central bore 200 and an annular groove 201, and a magnifying glass 10 having a central hole 100. The block member 20 is detachably and frictionally sleeved around the shank (A), and is detachably and frictionally fitted in the central hole 100 of the magnifying glass 10. The magnifying glass 10 is engaged in the annular groove 201 of the block member 20.

Figure 2:
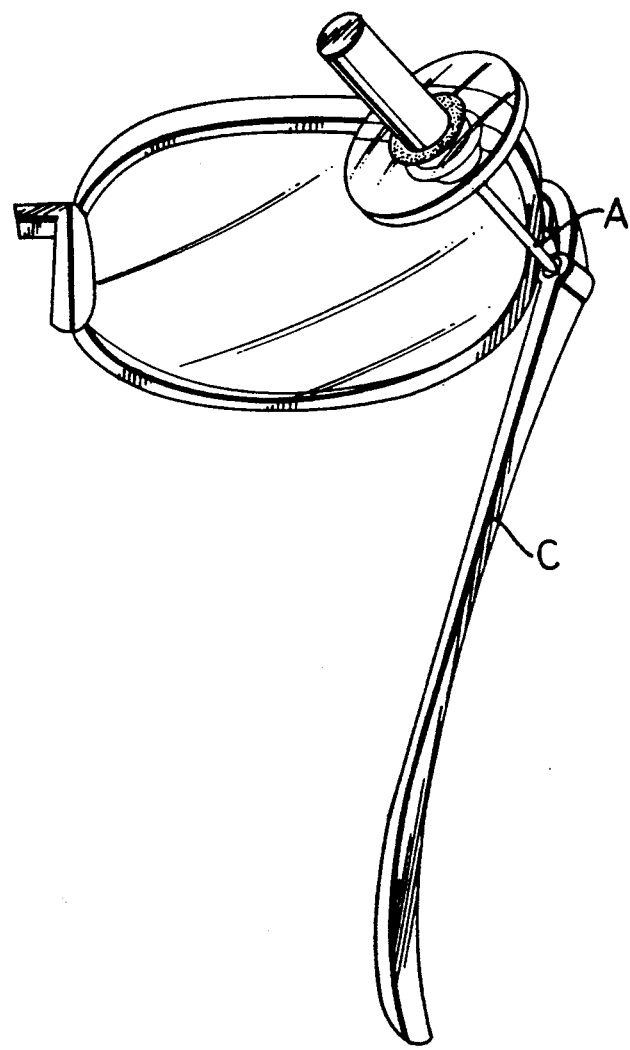
FIG. 2 shows that the first preferred embodiment is applied to screw a pair of glasses.

In FIG. 2, the combined screwdriver and magnifying glass is applied to screw a pair of eyeglasses (C).

Figure 3A:
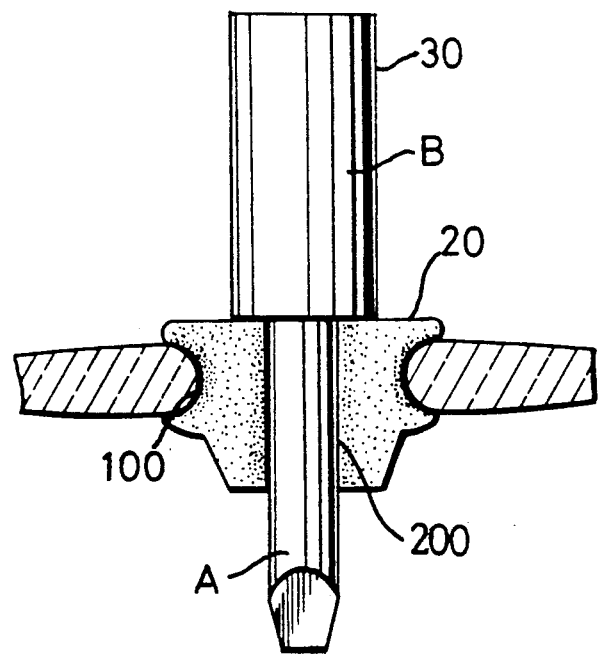
FIG. 3(A) is a schematic sectional view of the first preferred embodiment.
Figure 3B:
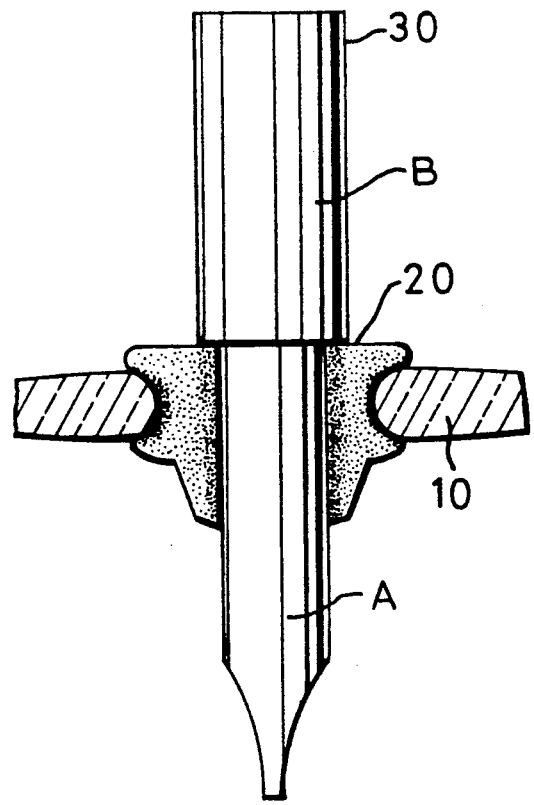
FIG. 3(B) is a schematic sectional view of the first preferred embodiment, but with its shank being replaced with another shank which has a larger diameter.

The block member 20 can accommodate different diameters of shanks. The shank (A') in FIG. 3(B) has a larger diameter than that of the shank (A) in FIG. 3(A).

Figure 4:
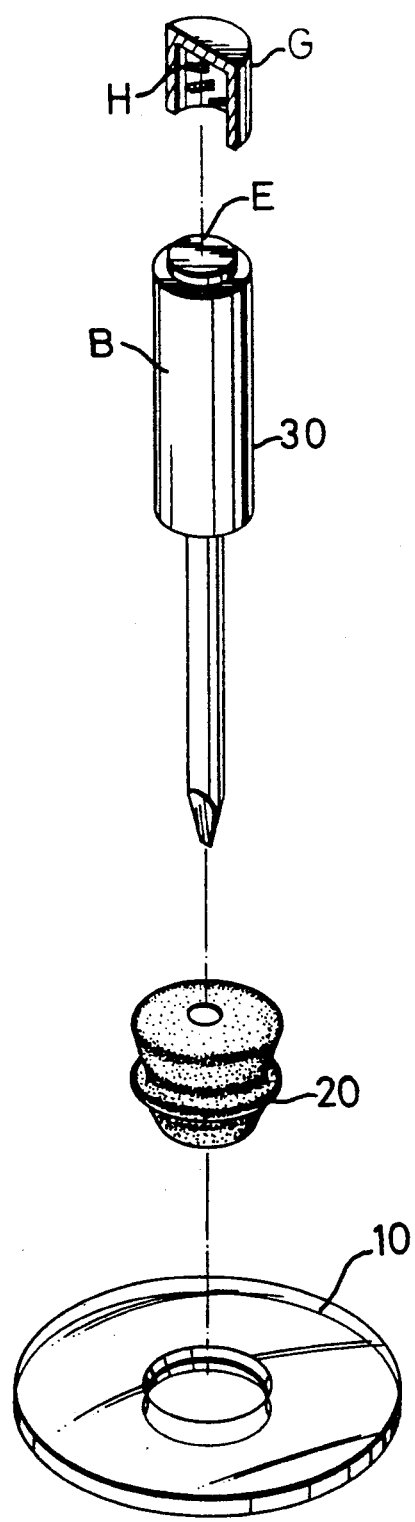
FIG. 4 is an exploded view of a second preferred embodiment of the combined screwdriver and magnifying glass of this invention.

The other preferred embodiment of the combined screwdriver and magnifying glass shown in FIG. 4 includes a hollow casing (G) detachably mounted on a top end (E) of the handle (B), and a plurality of screws (H) received in the hollow casing (G). Therefore, when a person uses such a combined screwdriver and magnifying glass, he can immediately and conveniently get the screw which is required.

Therefore, the combined screwdriver and magnifying glass of this invention is convenient for use.

While the present invention has been described in connection with what is considered the most practical and preferred embodiment, it is understood that this invention is not limited to the disclosed embodiment, but is intended to cover various arrangements included within the spirit and scope of the broadest interpretations and equivalent arrangements.

I claim:

1. A combined screwdriver and magnifying glass comprising:

a screwdriver having a handle and a shank connected to said handle, said handle including a top end, a hollow casing detachably mounted on said top end, and a plurality of screws received in said hollow casing;

a block member made of elastic material detachably and frictionally sleeved around said shank, said block, member having an upper portion having an annular groove and a lower portion below said annular groove, said lower portion providing an added axial length and an added contact surface between said block member and said shank for increasing a retaining force between said block member and said shank, said lower portion having a cross-section smaller than that of said upper portion in order to compensate for the increased resistance resulting from said added axial length and said added contact surface; and a magnifying glass sleeved around said block member and engaged in said annular groove.

* * * * *